ARRANGEMENT FOR INDICATING ONE OR SEVERAL CONDUCTION CURRENTS

Filed Dec. 29, 1964

INVENTOR.
JÖNS KURT ALVAR OLSSON
BY Hane and Nydick
ATTORNEYS

United States Patent Office
3,458,712
Patented July 29, 1969

3,458,712

ARRANGEMENT FOR INDICATING ONE OR SEVERAL CONDUCTION CURRENTS

Jöns Kurt Alvar Olsson, Tullinge, Sweden, assignor to Telefonaktiebolaget L M Ericsson, Stockholm, Sweden Filed Dec. 29, 1964, Ser. No. 421,961
Claims priority, application Sweden, Jan. 15, 1964, 459/64
Int. Cl. H01f 27/42
U.S. Cl. 307—88 2 Claims

ABSTRACT OF THE DISCLOSURE

A matrix comprises a plurality of matrix elements wherein each element is used to sense for the flow of current in a different circuit. Each element comprises two magnetic cores with an input winding connected to one of the different circuits, a magnetization switching winding and an output or sense winding. Each winding threads both cores. The sense winding yields an output signal only when a current is flowing in the input winding when the magnetization of the cores is switched in response to a current pulse in the magnetization switching winding.

The present invention refers to an arrangement for indicating one or several conduction currents by the aid of magnetic ring cores of a material with strong remanence and saturation qualities. The arrangement is of such a kind that for each one of the ring cores there is a magnetization winding for magnetizing the core in question to saturation in a certain direction, and a demagnetizing winding for demagnetizing the core in question to a value that is considerably smaller than the remanence value of magnetized cores.

An object of the invention is to provide an arrangement of the kind mentioned above which is suitable for scanning, for instance the state of the circuits of electronic telephone exchanges to test more rapidly disengaged or busy subscriber numbers. The arrangement is specially suitable for testing a very large number of line circuits within a small space.

A device according to the invention is characterized in that, for each conduction current, there are two cores with one conduction winding on each core. The conduction winding for one of the two cores is so wound that it will magnetically actuate the associated core in a certain direction while the conduction winding for the other of the two cores is so wound that it will magnetically actuate that core in the opposite direction, and that for the two cores there is a common indication winding arranged to give a voltage dependent on the difference in total magnetic flux of the two cores.

Figure 1:
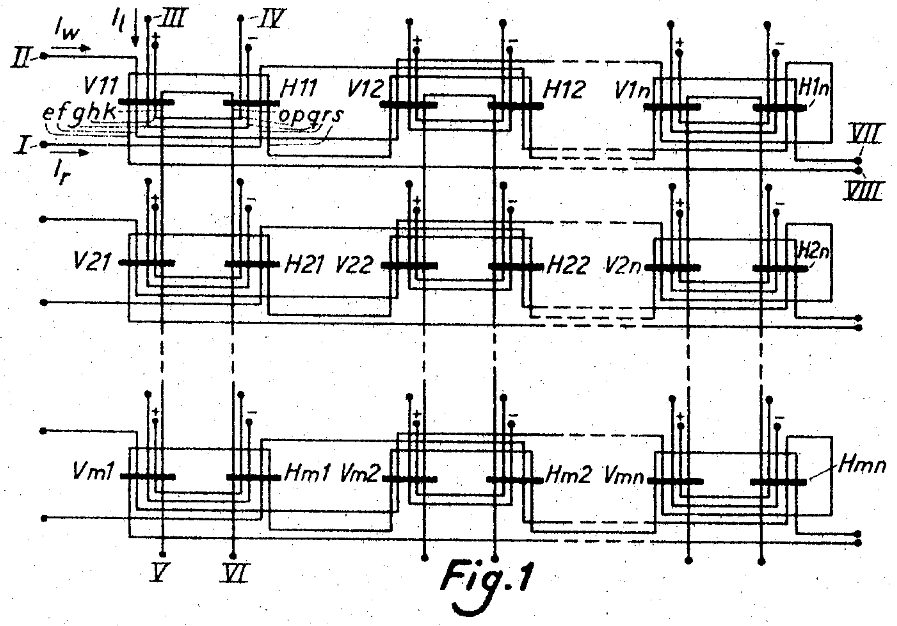
Figure 2:
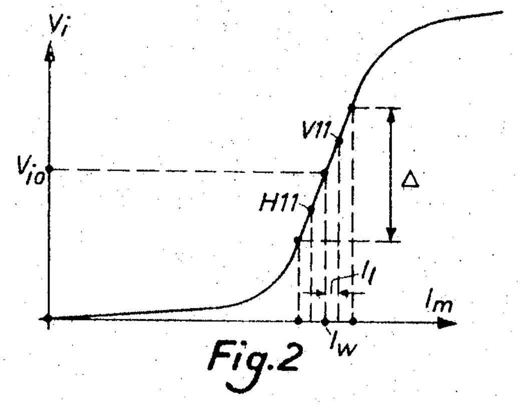
Figure 3:
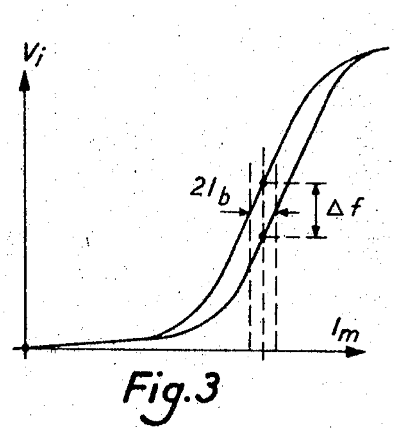
Figure 4:
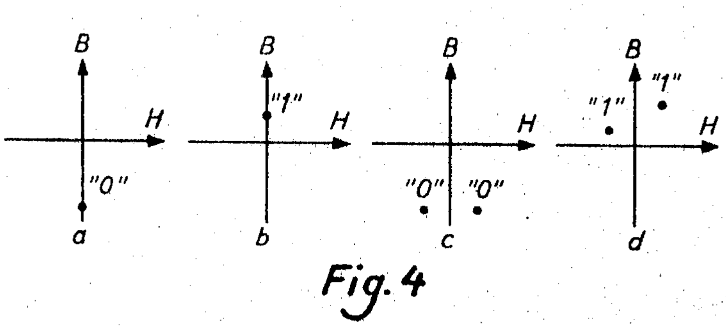

The invention will be further described in connection with the accompanying drawing, where FIG. 1 schematically shows the arrangement of cores and windings in a device according to the invention. FIG. 2 shows the indication voltage $V_1$ as a function of the total magnetization current $I_m$ for two identical cores included in the arrangement, FIG. 3 shows the difference of the indication current from two not identical cores, and finally FIG. 4 shows a different magnetizing state in two cores intended for one line.

The invention will at first be described in connection with only two of the 18 cores shown in FIG. 1, that is, the cores V11 and H11 of the matrix. These two cores are intended to indicate, for instance, the conduction current $I_1$ of a subscriber. The conduction circuit of the subscriber is then connected to terminals III and IV, which are connected to each other through core windings, *g, q, h, p* and a station battery (—+). The left core V11 has windings *e, f, g, h, k,* the right core H11 has the windings

*o, p, q, r, s.* The cores consists of magnetic ring cores shaped from material with marked remanence and saturation qualities. For magnetizing the core V11 to saturation in a certain direction the winding *f* is used and for corresponding magnetizing the core H11 the winding *r* is used. By this configuration a magnetizing current $I_r$ "read current" is fed from the terminal 1 through the windings *r* and *f* in direction from below up to the terminal II. For demagnetizing the core V11 to a value that is considerably lower than the remanence value for magnetized cores the winding *f* is used and for a corresponding demagnetizing of the core H11 the winding *r* is used. Hereby a demagnetizing current $I_w$ "write current" is fed from the terminal II through the windings *f* and *r* in direction from above downwards to the terminal I.

FIG. 4*a* shows the magnetic condition of the cores V11 and H11 after magnetization with the current $I_r$, provided that no conduction current is fed to the terminals III–IV. The cores may be said to be zero set, which is indicated by the designation "0."

FIG. 4*b* shows the magnetic state of the cores V11 and H11 after demagnetizing with the demagnetization current $I_w$, still provided that no conduction current is fed to the terminals III–IV. The cores may be said to be set to one, which is indicated by the designation "1." If a core is provided with an indication winding and is magnetically actuated so that it is switched from its one-set condition to its zero-set condition, a voltage will arise in the indication winding, which voltage is dependent of the relative positions "1" and "0." The cores V11 and H11 have each its indication winding *k* and *o*, respectively which two partial windings are connected in series between two terminals V and VI. The partial windings thus form together a common indication winding and the partial windings are so arranged that in the common indication winding V–*k*–*o*–VI a voltage is generated which is dependent on the difference in total magnetic flux change of the two cores V11 and H11.

FIG. 2 shows the case where the two cores have the identical magnetic characteristic and at the time of demagnetization by the current $I_w$ and a following magnetization with the current $I_r$ to give rise to an indication voltage $V_{10}$. Since the indication partial windings *k* and *o* counteract each other no voltage is obtained between the terminals V–VI, which indicates that the conduction current $I_1$ of the subscriber at this very moment is zero.

FIG. 4*c* shows the magnetic state of the cores V11 and and H11 after magnetization with current $I_r$, provided that a conduction current $I_1$ is fed to the terminals III–IV. The two cores are still set to zero but their magnetic state is somewhat displaced to the right and left, respectively, of the remanence point "0" in FIG. 4*a*.

FIG. 4*d* shows the magnetic state of the cores V11 and H11 after demagnetization with the demagnetization current $I_w$, however, as was the case in FIG. 4*c* provided that the conduction current $I_1$ is still fed to the terminals III–IV. The two cores are now set to one as was the case in FIG. 4*b*, but their magnetic state is somewhat displaced upwards to the right and downwards to the left, respectively, in relation to the point "1" in FIG. 4*b*. After the demagnetization mentioned above, which thus occurs with the current $I_w+I_1$ for the core V11 and with the current $I_w-I_1$ for the core H11, and the following magnetization with the current $I_r-I_1$, a voltage is obtained between the terminals V and VI, that is, in the indication winding, which voltage indicates that the conduction current $I_1$ of the subscriber at this moment has a value, which is different from zero. As appears from FIG. 2 this voltage is in proportion to $2 \cdot I_1$ as long as the demagnetization occurs at points within the straight area $\Delta$ of the characteristic. As an example of the size of the different currents the following values can be given: $I_r=450$ ma., $I_w=275$ ma. and $I_l=25$ ma.

With a few words the whole device according to FIG. 1 will now be described. The device comprises $m \cdot n \cdot 2$ cores arranged in $m$ rows and $n$ columns with the cores V11, H11; H12, H12; . . . V1$n$, H1$n$ in the first row, the cores V11, H11; V21, H21; . . . V$m$1, H$m$1 in the first column and so on. In each row all the windings $f$ of the left cores (for instance V11, V12 . . . V1$m$) are connected in series with each other and the windings $r$ of all the right cores (for instance H11, H12 . . . H1$n$) are connected in series with each other, and these two series connections are in their turn arranged in series between the terminals I and II. In each column the indication partial winding $k$ of all the left cores are series connected to each other and the indication partial windings $o$ of all the right cores are series connected to each other, and these two connections are in their turn connected between the terminals V–VI and form a common indication winding.

In connection with conduction circuits which are impaired by essential leakage, certain problems can arise at the indication of conduction currents. For such cases it can be suitable to supply all the cores in the arrangement with a premagnetization winding, that is the winding $e$ in left cores and the winding $s$ in right cores. These windings are so arranged so that they counteract the conduction current in the core in question; further premagnetization windings for the cores in each row are series connected among themselves and this series connection is connected between terminals VII–VIII. With a fed premagnetization current of such a size that it gives rise to the same number of ampere turns as the maximal leakage current, there is achieved the situation that the indication voltage in the indication winding will have the value zero for a conduction current equal to the maximal leakage current while it will have a value with a certain polarity for a conduction current larger than the maximal leakage current and will have a value of opposite polarity for a conduction current smaller than the maximal value of the leakage current. Thus when testing the voltage induced in the indication winding it is only necessary to distinguish between positive or negative signal instead of between large or small amplitude of the signals, the former being more simple and permitting a larger percentage conduction current.

In the preceding it has been presumed that the curve $V_i=f(I_m)$ according to FIG. 2 is the same for two cores, for instance cores V11 and H11. However, it can happen that the cores have somewhat different magnetic qualities, as is clear from FIG. 3. When the cores are influenced by resultant currents $I_m$ of the same size a certain, not unessential voltage is nevertheless induced in the common indication winding, which voltage as to the amplitude and polarity is dependent of the difference $\Delta f$ between the curves in FIG. 3. For an unfavourable combination of the cores in the pair, the indication voltage will have the same polarity as the one obtained for indicatable conduction current. With a precurrent through the windings $e$ and $s$ counter-directed to the conduction current, and with an amplitude corresponding to half the distance between the parts in question of the extreme curves in FIG. 3, the indication signal caused by dissimilar cores aways will have a polarity opposite the polarity of the indication signal caused by indicatable conduction current.

I claim:

1. A matrix element for indicating a flow of current from a signal source comprising: two magnetic cores, a signal conductor connected to said signal source and threading said first and second cores in opposite senses, a magnetization winding having first and second terminals, said magnetization winding threading said first and second cores; means for alternately applying, via said terminals, a current pulse either of a first polarity and of such a maguitude to magnetize both of said cores to a saturation state or of a second polarity and of such a magnitude to magnetize both of said cores to a magnetization state which is less than the remanent magnetization of said cores, a sense conductor threading said cores, the directions which said magnetization winding and said sense conductor thread said cores being such that when a current pulse in said magnetization winding changes the magnetization state of said cores a voltage pulse is developed across the ends of said sense conductor only when a signal current is flowing through said signal conductor during the occurrence of said current pulse.

2. A matrix comprising a plurality of matrix elements according to claim 1 wherein said elements are arranged in row and column directions, and wherein the sense conductors of all the cells in each of one of said row and column directions are connected in series and the magnetization windings in each of the other of said row and column directions are connected in series.

References Cited

UNITED STATES PATENTS

| | | | |
|---|---|---|---|
| 2,801,344 | 7/1957 | Lubkin | 307—88 |
| 2,958,853 | 11/1960 | Ridler et al. | 307—88 |
| 2,975,298 | 3/1961 | Fawcett et al. | 307—88 |
| 3,124,700 | 3/1964 | Burns | 307—88 |

FOREIGN PATENTS

| | | |
|---|---|---|
| 706,736 | 4/1954 | Great Britain. |

BERNARD KONICK, Primary Examiner

B. L. HALEY, Assistant Examiner